United States Patent
Fry et al.

(10) Patent No.: US 10,859,453 B2
(45) Date of Patent: Dec. 8, 2020

(54) MECHANICAL INTEGRITY SENSOR

(71) Applicant: INTERNATIONAL BUSINESS MACHINES CORPORATION, Armonk, NY (US)

(72) Inventors: Jonathan R. Fry, Fishkill, NY (US); Jonathan D. Bradbury, Poughkeepsie, NY (US); Michael R. Kane, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

(21) Appl. No.: 16/202,285

(22) Filed: Nov. 28, 2018

(65) Prior Publication Data

US 2020/0166420 A1 May 28, 2020

(51) Int. Cl.
*G01L 1/24* (2006.01)
*G01L 5/00* (2006.01)
*G01L 5/24* (2006.01)

(52) U.S. Cl.
CPC ............ *G01L 1/242* (2013.01); *G01L 5/0052* (2013.01)

(58) Field of Classification Search
CPC ..... G01L 1/06; G01M 99/007; G01M 5/0083; G01M 5/0033; H05K 2201/10151; H05K 1/0293; H05K 1/16; G01N 19/08; G01N 27/24; G01N 27/205
See application file for complete search history.

(56) References Cited

U.S. PATENT DOCUMENTS

| | | | |
|---|---|---|---|
| 6,094,144 A | 7/2000 | Dishongh et al. | |
| 6,366,209 B2 | 4/2002 | Dishongh et al. | |
| 6,452,502 B1 | 9/2002 | Dishongh et al. | |
| 7,741,834 B2 | 6/2010 | Dang et al. | |
| 8,028,405 B2 | 10/2011 | Nolleck et al. | |
| 9,239,283 B2 | 1/2016 | Honda et al. | |
| 2015/0226579 A1 | 8/2015 | Nino et al. | |

OTHER PUBLICATIONS

"Chip Scale Review: The Future of Semiconductor Packaging", vol. 21, No. 3, (May-Jun. 2017) 68 pages.
Fike Product Data Sheet, "ATLAS Rupture Disc", http://www.fike.com/products/atlas-high-performance-rupture-disc/, downloaded and printed Nov. 15, 2018 (2 pages).

(Continued)

*Primary Examiner* — Brandi N Hopkins
(74) *Attorney, Agent, or Firm* — Teddi Maranzano, Esq.; Kevin P. Radigan, Esq.; Heslin Rothenberg Farley & Mesiti P.C.

(57) ABSTRACT

Mechanical integrity sensors are provided to detect occurrence of an out-of-tolerance force on a component, such as a circuit board. The mechanical integrity sensor includes a light-blocking container and a light collector disposed within the light-blocking container. The light-blocking container includes a breakable panel. The breakable panel fractures with a force on the breakable panel indicative of the out-of-tolerance force on the component. Fracturing of the breakable panel allows light into the light-blocking container, and the light is collected by the light collector as indicative of the occurrence of the out-of-tolerance force on the component.

20 Claims, 7 Drawing Sheets

(56) References Cited

OTHER PUBLICATIONS

Emerson Product Brochure, "Marston Bursting Disc Indicators: Installation and Maintenance Instructions", http://safetysystems.valves.pentair.com/brands/marston/bursting-discs/,downloaded and printed Nov. 15, 2018 (3 pages).
BS&B Product Overview, "Rupture Disks (Bursting Discs)—Reverse Buckling Disks/Forward Acting Disks", http://www.bsbsystems.com/Rupture_Disks/rupture_disks.html,downloaded and printed Nov. 15, 2018 (6 pages).
Bradbury et al., "Optical Deformation Detection Sensor and System", U.S. Appl. No. 15/646,138, filed Jul. 11, 2017 (33 pages).
Bradbury et al., "Electro-Mechanical Fuse for Detecting Monitored Component Deflection", U.S. Appl. No. 15/720,861, filed Sep. 29, 2017 (26 pages).
Bradbury et al., "Fracture Ring Sensor", U.S. Appl. No. 15/725,380, filed Oct. 5, 2017 (29 pages).
Bradbury et al., "Damage Detection System", U.S. Appl. No. 15/825,576, filed Nov. 29, 2017 (33 pages).

MECHANICAL INTEGRITY SENSOR

BACKGROUND

A printed circuit board assembly (PCBA), as an example, is used to mechanically support and electrically connect electronic components using conductive pathways, tracks, signal traces, etc. The electronic components can include circuit elements such as capacitors, resistors, active devices, etc. Damaging the printed circuit board during manufacture, installation, servicing, or other handling, can cause the electronic components, or the printed circuit board itself, to weaken or even fail.

One type of failure in a printed circuit board assembly is a strain-induced failure. Strain-induced failure can be caused by subjecting the printed circuit board to sufficiently large deflection, torque, insertion, or shock force (generally referred to herein as out-of-tolerance force). A strain-induced failure can result, for example, in cracked ball grid array (BGA) solder joints, intermittent opens of conductive traces or joints, a cracked printed circuit board, and/or cracked electronic components, such as capacitors, resistors, active devices, etc. Inadvertently operating a damaged printed circuit board or component can exacerbate the problem as powering damaged circuitry can cause further damage to the equipment, as well as to electrically coupled components. Such damage associated with occurrence of an out-of-tolerance force can reduce overall device yield and profitability.

SUMMARY

Certain shortcomings of the prior art are overcome and additional advantages are provided through the provision, in one or more aspects, of an apparatus which includes a mechanical integrity sensor to detect occurrence of an out-of-tolerance force on a component. The mechanical integrity sensor includes a light-blocking container with a breakable panel. The breakable panel fractures with a force on the breakable panel indicative of the out-of-tolerance force on the component. The mechanical integrity sensor further includes a light collector disposed within the light-blocking container. Fracturing of the breakable panel allows light into the light-blocking container, and the light is collected by the light collector as indicative of occurrence of the out-of-tolerance force on the component.

In another aspect, an apparatus is provided which includes a circuit board and a mechanical integrity sensor associated with the circuit board to detect occurrence of an out-of-tolerance force on the circuit board. The mechanical integrity sensor includes a light-blocking container with a breakable panel. The breakable panel fractures with a force on the breakable panel indicative of the out-of-tolerance force on the circuit board. The mechanical integrity sensor further includes a light collector disposed within the light-blocking container. Fracturing of the breakable panel allows light into the light-blocking container, and the light is collected by the light collector as indicative of occurrence of the out-of-tolerance force on the circuit board.

In a further aspect, a method of facilitating detecting an out-of-tolerance force on a component is provided. The method includes providing a mechanical integrity sensor to detect occurrence of the out-of-tolerance force on the component. Providing of the mechanical integrity sensor includes providing a light-blocking container with a breakable panel. The breakable panel fractures with a force on the breakable panel indicative of the out-of-tolerance force on the component. Further, providing the mechanical integrity sensor includes disposing a light collector within the light-blocking container, wherein fracturing of the breakable panel allows light into the light-blocking container. The light is collected by the light collector as indicative of occurrence of the out-of-tolerance force on the component.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description and the specific example(s), while indicating aspects of the invention, are given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to facilitate, for instance, providing a mechanical integrity sensor and controller to detect occurrence of an out-of-tolerance force on a component, such as a circuit board.

Critical deflection, torque, and insertion tolerances can be defined for various products, beyond which product reliability, operation, or safety can be compromised. For instance, subjecting a circuit board to excessive impact or deflection forces can damage the circuit board, and/or components in or coupled to the circuit board. Strain-induced failures substantially impact product reliability and profitability. Consequently, monitoring for and detecting out-of-tolerance forces experienced by a product can be particularly advantageous. The monitoring for, and detecting, cases where deflection, torque, or other force tolerances have been exceeded can be advantageous to maintaining a profitable product line and preventing unsafe product operating conditions.

Generally stated, disclosed herein are apparatuses and methods for detecting and recording occurrence of an out-of-tolerance force on a component in order to ensure quality and reliability of the component. The out-of-tolerance force could be a deflection force, a torque force, an impact force, an insertion force, etc., applied to the component. In one or more aspects, the apparatus includes a mechanical integrity sensor to detect occurrence of an out-of-tolerance force on a component. The mechanical integrity sensor includes a light-blocking container with a breakable panel. The light-blocking container is positioned and configured such that the breakable panel fractures with a force indicative of an out-of-tolerance force on the component. For instance, the breakable panel is calibrated to fracture with a specified force on the panel indicative of and resulting from the out-of-tolerance force on the component when the light-blocking container is associated with the component either directly (e.g., coupled to the component) or indirectly (e.g., spaced a certain specified distance from the component). The mechanical integrity sensor includes a light collector disposed within the light-blocking container. Fracturing or otherwise breaking the breakable panel of the light-blocking container allows light into the light-blocking container, and the light is collected by the light collector as indicative of occurrence of the out-of-tolerance force on the component.

In one or more embodiments, a controller is optically coupled to the light collector to identify when the light collector is collecting light within the light-blocking container, and based thereon, to perform an action due to occurrence of the out-of-tolerance force on the component. In one or more implementations, the action could be providing an indication of the occurrence of the out-of-tolerance force on the component to, for instance, allow a technician to verify integrity of the component. In one or other embodiments, the component could be a circuit board, such as a printed circuit board, and the action performed by the controller could include preventing powering up of the circuit board based on identifying occurrence of the out-of-tolerance force on the circuit board.

In one or more embodiments, the component is coupled to a chassis, and the mechanical integrity sensor is disposed between the component and the chassis. Further, the apparatus can include a light source to illuminate between the component and the chassis.

In one or more embodiments, the light source includes one or more optical fibers with one or more lenses, such as one or more light-dispersing lenses. In one or more implementations, a lens is located between the component and the light-blocking container, and the force is transferred across the lens from the component to the breakable panel of the light-blocking container with occurrence of the out-of-tolerance force on the component.

In one or more embodiments, the breakable panel forms a top panel or a bottom panel of the light-blocking container, and the lens directly contacts the breakable panel to apply the force with occurrence of the out-of-tolerance force on the component.

In one or more embodiments, the light-blocking container of the mechanical integrity sensor is configured to allow a fastener fastening the component to the chassis to pass therethrough. For instance, the light-blocking container can be a donut-shaped structure, and the breakable panel can be a top panel or a bottom panel of the light-blocking container. In one or more embodiments, the breakable panel can be positioned closer to the component than to the chassis.

Advantageously, as will be understood by one skilled in the art based on the description provided herein, the apparatus presented does not require the presence of power in order to record the occurrence of an out-of-tolerance force on a component, and can be implemented to interrupt power to a component before further damage occurs, as well as log the location of an out-of-tolerance force for later analysis. Also, the mechanical integrity sensor(s) disclosed herein can be used in environments where direct electrical sensing is not desirable (for instance, due to the potential for an electrical short), or even possible (such as in a radiation environment or an electromagnetic environment).

Advantageously, the light-blocking container of a mechanical integrity sensor disclosed herein, and more particularly, the breakable panel of the sensor, can be mechanically designed to fracture when subject to a specific force indicative of an out-of-tolerance force, such as deflection, on the component being monitored. By way of example, known yield strengths of materials can be used to select an appropriate material and thickness for the breakable panel of the light-blocking container.

When a targeted out-of-tolerance force is applied to the component being monitored, the mechanical integrity sensor, and in particular, the breakable panel of the light-blocking container of the sensor, fractures, allowing light to enter into the light-blocking container. This light is detected by the light collector disposed within the light-blocking container as indicative of occurrence of the out-of-tolerance force on the component. Moreover, because the mechanical integrity sensor naturally provides a hysteresis memory, product damage can be indicated after the fact, and even when the component being monitored is powered down, allowing for an integrity check to be completed prior to the product's operation. Consequently, as noted, the mechanical integrity sensor is well suited to environments where direct electrical sensing is not desirable or possible. In certain embodiments, hysteresis can be leveraged to provide a power interlock, whereby the component is prevented from powering up if the light collector detects light within the light-blocking container.

The targeted out-of-tolerance force for a component, and hence the specified force to fracture the breakable panel of the mechanical integrity sensor, can be adjusted as desired by changing position of the breakable panel relative to the component, by increasing or decreasing the thickness of the breakable panel, by changing the material of the breakable panel, and even by pre-weakening the breakable panel, such as by scoring the surface of the breakable panel. In this manner, the breakable panel of the light-blocking container can be tuned or tailored to fracture with a specified force, prior to actual product damage, allowing for component inspection, correction, and return to normal service, where possible.

As noted, the mechanical integrity sensor, and in particular, the light-blocking container, can be mechanically coupled to the component being monitored, either directly or indirectly. For instance, the light-blocking container can be coupled to a circuit board using a circuit board stand-off, or a fastener coupling the circuit board to a chassis of a larger system within which the circuit board is housed. With indirect coupling, direct mounting of the light-blocking container to the component is avoided, thereby preserving valuable component surface area, if desired. Indirect coupling of the light-blocking container of the mechanical integrity sensor to the component can also prevent potential damage to the component, due to fracturing of the breakable panel of the mechanical integrity sensor.

Another advantage of a mechanical integrity sensor configured as a ring or donut-shaped structure, such as disclosed herein, is that the breakable panel or disk configuration provides omnidirectional stress, torque, and compression detection, and is suitable for use in applications having stiffener plates.

Figure 1:
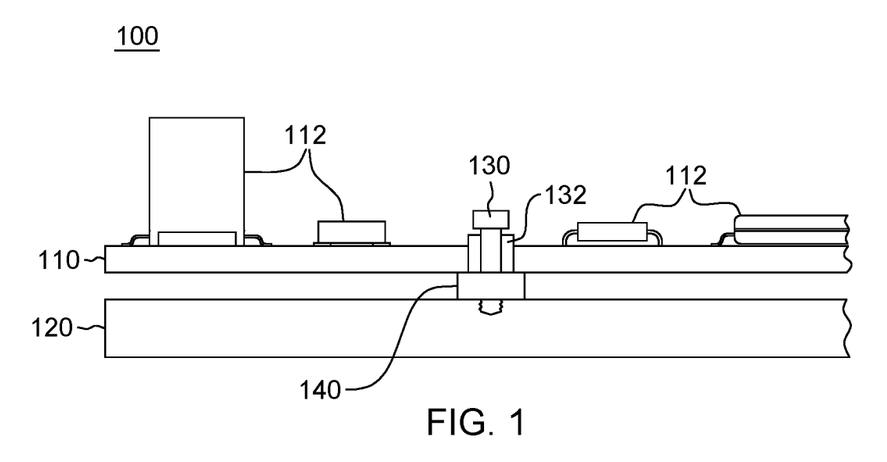
FIG. 1 depicts one embodiment of an apparatus including a mechanical integrity sensor, in accordance with one or more aspects of the present invention.

FIG. 1 depicts one embodiment of an apparatus 100, in accordance with one or more aspects of the present invention. In this embodiment, apparatus 100 includes a component 110, such as a printed circuit board, and a chassis 120, with the circuit board being fastened to chassis 120 via one or more fasteners 130. The circuit board includes one or more devices 112 mounted to a surface of the circuit board, as well as conductive pathways, traces, tracks, etc., on and/or within the circuit board. In other embodiments, component 110 could be any product having a critical deflection, torque, or insertion tolerance beyond which the product's reliability, operation, or safety is compromised, such as, for instance, at a display screen, a server component, a medical device component, an industrial equipment component, an aviation component, a scientific component, or a fault-tolerant/high-uptime system component.

In one or more embodiments, fastener 130 can be a stand-off connection (also known as a mounting point). Fastener 130 can be configured to pass through a collar or sleeve 132 isolating fastener 130 from component 110, and include threading at its end to threadably fasten into chassis 120. In the embodiment illustrated, a mechanical integrity sensor 140 (or opto-isolated mechanical integrity sensor) is positioned between component 110 and chassis 120, with fastener 130 passing through an opening in the mechanical integrity sensor. In this manner, an out-of-tolerance force, such as an out-of-tolerance deflection, torque, and/or insertion force, applied to component 110 is physically transferred through fastener 130 and/or component 110 to the mechanical integrity sensor 140.

In certain embodiments, a gap can exist between mechanical integrity sensor 140 and component 110, while in other embodiments, the mechanical integrity sensor 140, and in particular, the light-blocking container of the sensor, can be in direct contact with a surface of component 110. The sensor-to-component spacing distance can be adjusted based on the design requirements of the specific application, and could range from, for instance, zero to ten mm, or more. For example, the spacing can be increased in applications where the design specification allows for some flexing of component 110, and a flush-mount (direct contact) approach can be used when no flexing of the component is allowed. While only a single fastener 130 is depicted for illustration, it will be understood that a plurality of fasteners 130 can couple a single component 110 to chassis 120, any one or more of which could include, or have associated therewith, a respective mechanical integrity sensor.

In some embodiments, a plurality of mechanical integrity sensors can be employed between component 110 and chassis 120. For instance, in one or more embodiments, the plurality of mechanical integrity sensors could be equally distributed along the component (not depicted). In other embodiments, mechanical integrity sensors could be concentrated along particular points of interest of the component (for instance, concentrated along the forward edge and/or center, along high-power regions, under active components such as chips, etc.).

As explained herein, mechanical integrity sensor 140 includes a light-blocking container with a breakable panel, and a light collector disposed within the light-blocking container. The light-blocking container is configured to block light from entering into the container when structurally intact. The breakable panel is positioned to fracture with a force on the breakable panel indicative of the out-of-tolerance force on the component. In one or more embodiments, the breakable panel could be a top panel, a bottom panel, and/or a sidewall panel of the light-blocking container. The light collector disposed within the light-blocking container can be, or include, a fiber optic readout, which includes a fiber optic line or cable and, for instance, a light-collecting lens, such as a fisheye lens, or similar lens, disposed within the light-blocking container to consolidate any light within the container. With fracturing of the breakable panel due to an applied force on the breakable panel that is indicative of the out-of-tolerance force on the component, the light enters the container, and the collector detects the light within the light-blocking container, with the collected light being indicative of occurrence of the out-of-tolerance force on the component. Based on light being collected by the light collector, a controller or monitor optically coupled to the reflective light from the collector, can perform an action due to the occurrence of the out-of-tolerance force on the component.

Figure 2:
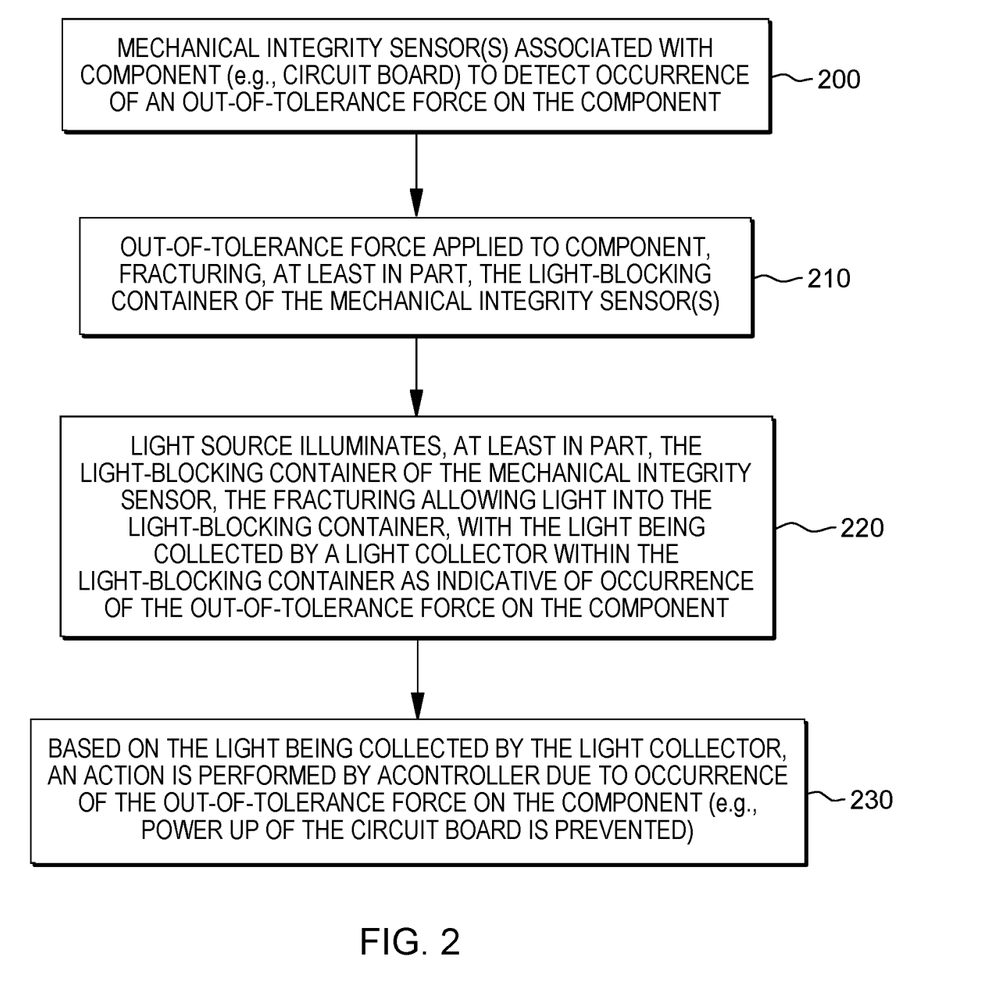
FIG. 2 depicts one embodiment of a process for detecting occurrence of an out-of-tolerance force on a component using a mechanical integrity sensor, and for taking an action based thereon, in accordance with one or more aspects of the present invention.

FIG. 2 depicts one embodiment of a process for detecting an out-of-tolerance force on a component, in accordance with one or more aspects of the present invention. As illustrated, one or more mechanical integrity sensors such as disclosed herein are associated with a component, such as a circuit board, to detect occurrence of a specified out-of-tolerance force on the component 200. With applying of the out-of-tolerance force to the component, the light-blocking container of the mechanical integrity sensor fractures, at least in part 210. For instance, one or more breakable panels of the light-blocking container could be designed to fracture with an applied force indicative of the out-of-tolerance force on the component. A light source can be provided to illuminate, at least in part, the light-blocking container of the mechanical integrity sensor, and the fracturing allows light from the light source into the light-blocking container, with the light being collected by the light collector within the light-blocking container as indicative of occurrence of the out-of-tolerance force on the component 220. Based on the light being collected by the light collector, and being identified by a controller, an action is performed by the controller due to occurrence of the out-of-tolerance force on the component 230. For instance, in the case where the component is a circuit board, powering up of the circuit board can be prevented, or if the out-of-tolerance force occurs during operation of the circuit board, the circuit board can be powered off by the controller in order to allow for further evaluation of the circuit board prior to continued operation.

FIGS. 3A-3D depict an operational embodiment of an apparatus 100' which includes mechanical integrity sensor 140 to detect occurrence of an out-of-tolerance force on component 110. Apparatus 100' is similar to apparatus 100 depicted in FIG. 1, and described above, with the exception that additional space is provided between component 110 and chassis 120, by way of further example only.

Figure 3A:
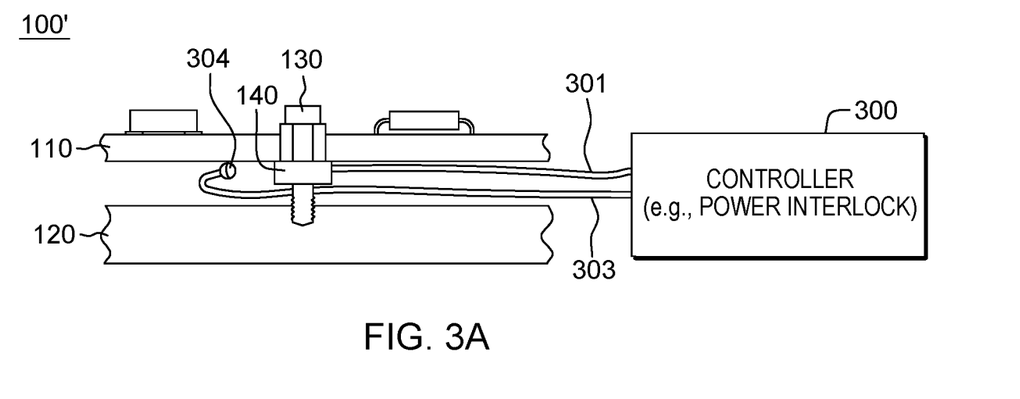
FIGS. 3A-3D depict an operational embodiment of an apparatus, including a mechanical integrity sensor to detect occurrence of an out-of-tolerance force on a component, and to take an action based thereon, in accordance with one or more aspects of the present invention.

As shown in FIG. 3A, a controller 300 is optically coupled via fiber optic 301 to the light collector (see FIG. 4B) disposed within the light-blocking container of mechanical integrity sensor 140, and controller 300 is optically coupled to a fiber optic 303 which extends into the space between component 110 and chassis 120, and which includes a light-dispersing lens 304 at an end thereof. As understood in the art, optical fibers 301, 303 are flexible, transparent fibers that transmit light between the ends of the fiber. The optical fibers are immune to electromagnetic interference, and as noted, one optical fiber 301 facilitates transmission of collected light from the light collector within the mechanical integrity sensor to the controller, while the other fiber optic 303 facilitates illumination of the space between component 110 and chassis 120. If desired, multiple fiber optics 303 and light-dispersing lenses 304 could be positioned within the space between component 110 and chassis 120.

Controller 300 can be implemented in any of a variety of embodiments. In one or more embodiments, controller 300 could include an optical module with, for instance, one or more photoresistors to convert an optical signal to an electrical signal, and one or more optical transmitters to convert an electrical signal to an optical signal. The particular type of optical fiber and controller employed can be a matter of design choice for a particular application. In one or more embodiments, controller 300 can implement a power interlock unit, which prevents power from being restored or provided to component 110, and any potentially connected equipment to be protected upon collection of light by the light collector. In some embodiments of the present invention, the controller, including the power interlock feature, can be electrically powered separately from the component 110. In other words, controller 300 can be powered on while the component 110 remains in a powered off state. Alternatively, the controller could be powered on before powering on of the component during a startup operation of a system which includes the component and controller.

Figure 3B:
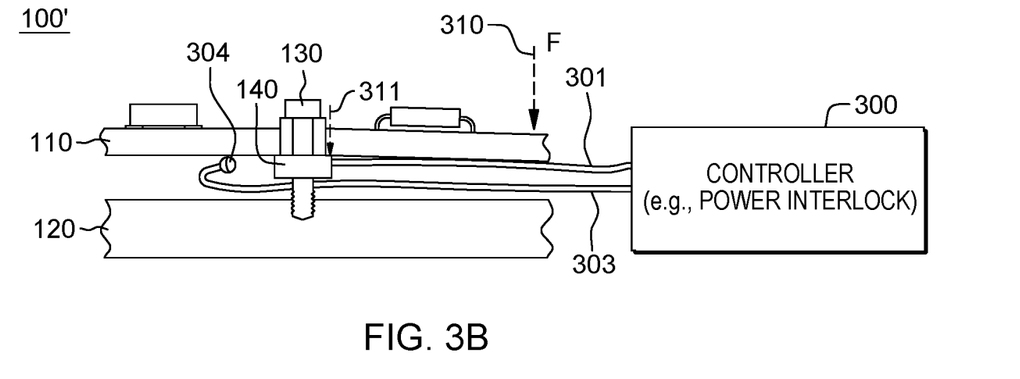
Figure 3C:
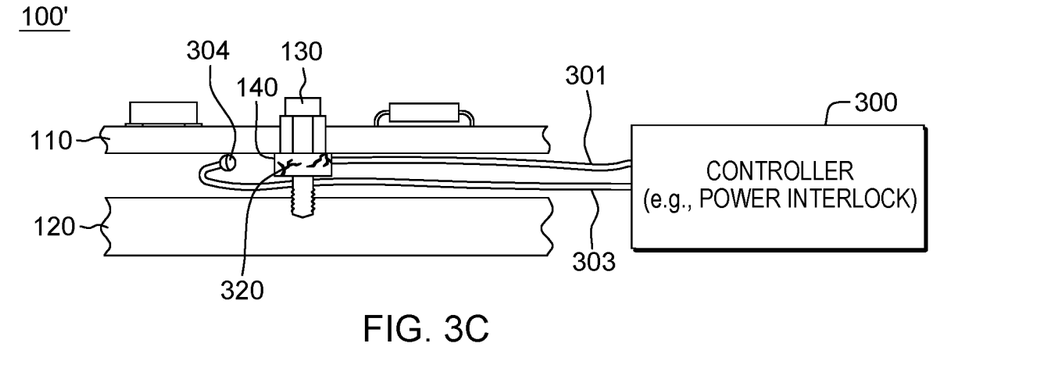
Figure 3D:
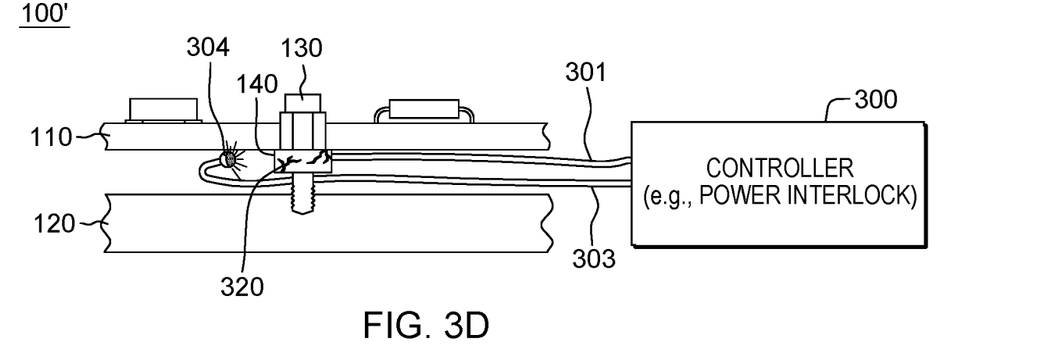

In FIG. 3B, an out-of-tolerance force (F) 310 is applied to component 110, causing a temporary deflection or deformation of the component (with, for instance, no obvious damage to the component). The out-of-tolerance force 310 results in a force (F) 311 being applied to the mechanical integrity sensor 140, and in particular, to a breakable panel of the light-blocking container of the mechanical integrity sensor. The force 311 is indicative of the out-of-tolerance force 310 on component 110. The resultant fracturing 320 of the breakable panel, or more generally, the light-blocking container, is depicted in FIG. 3C due to the applied force of FIG. 3B. As shown in FIG. 3D, in one or more embodiments, at a later point in time, controller 300 illuminates the space between component 110 and chassis 120 by providing light through fiber optic 303 to dispersing lens 304. Due to the fracturing 320 of the light-blocking container of the mechanical integrity sensor 140, light is collected within the light-blocking container by the light collector, and the collected light is sensed by controller 300 via fiber optic 301.

As noted, controller 300 can be configured to take a variety of actions based upon identifying that the collector is collecting light within the light-blocking container. For instance, the controller can be configured as a power interlock to prevent powering up of the component, or if already powered, to power down the component, and/or could provide an indication of occurrence of the out-of-tolerance force, as well as an indication of location of the out-of-tolerance force, if desired.

Figure 4A:
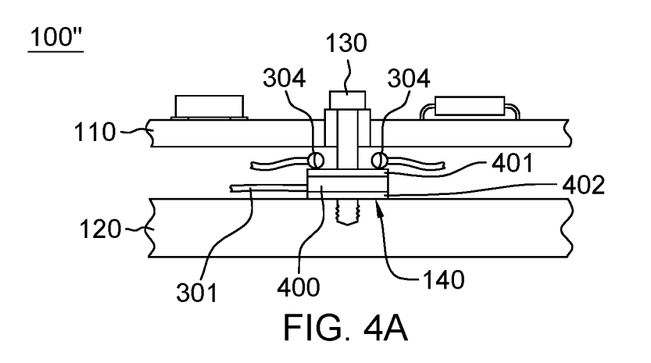
FIG. 4A depicts a detailed embodiment of an apparatus including a mechanical integrity sensor, in accordance with one or more aspects of the present invention.
Figure 4B:
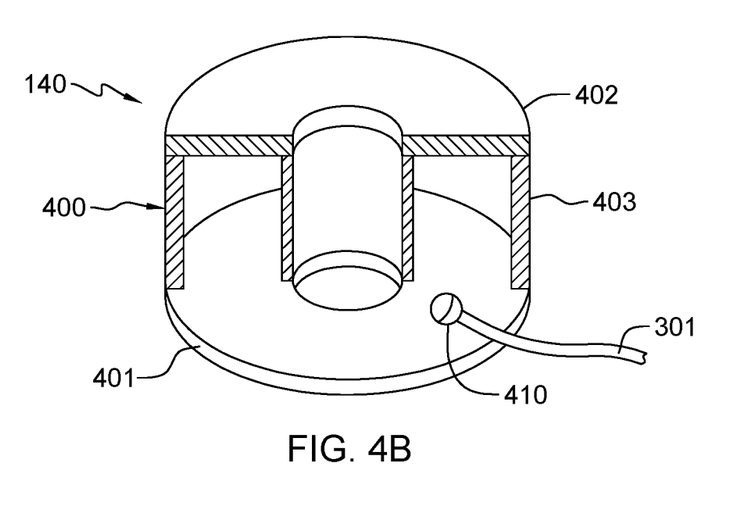
FIG. 4B is a partial cut-away, bottom plan view of the mechanical integrity sensor of FIG. 4A, in accordance with one or more aspects of the present invention.

FIGS. 4A & 4B depict a more detailed embodiment of a mechanical integrity sensor 140, in accordance with one or more aspects of the present invention. In particular, an apparatus 100" is shown configured similar to apparatus 100 of FIG. 1, and apparatus 100' of FIGS. 3A-3D.

As shown in FIG. 4A, in the apparatus 100" embodiment depicted, mechanical integrity sensor 140 is spaced from component 110, and one or more lenses 304, such as one or more light-dispersing lenses, are positioned between a light-blocking container 400 of mechanical integrity sensor 140 and the component 110.

In the detailed embodiment depicted, and by way of example only, light-blocking container 400 includes a top panel 401, a bottom panel 402, and a sidewall panel 403, one or more of which can be configured as a breakable panel of the mechanical integrity sensor. For instance, in one or more embodiments, top panel 401 is a breakable panel positioned and configured to fracture with a force on the breakable panel indicative of the out-of-tolerance force on the component 110. In the embodiment shown, the force to be applied to breakable top panel 401 can be transferred across one or more light-dispersing lenses 304 from component 110 to light-blocking container 400. In one or more other embodiments, the top panel 401, configured as a breakable panel, could directly contact component 110. The top panel 401, or breakable panel in the embodiment illustrated, can be, for instance, a pressure-burst ring or rupture disk, which is configured to fracture or break at a specific force threshold. For instance, the material selected for breakable panel 401 is brittle enough to fracture or break at a specific force, or at a required threshold prior to occurrence of an out-of-tolerance force on the component.

By way of example, top (breakable) panel 401 can be configured to fracture at some percentage of an unacceptable, out-of-tolerance force on the component. In one or more embodiments, the breakable panel is brittle enough to yield at a specified amount of force or component deformation, but strong enough to withstand typical handling. Material considerations for the breakable panel are based, in part, on known yield strengths of materials (also known as break strength), and the specified out-of-tolerance force specified for a given application. Suitable materials include non-conductive, brittle, and/or inelastic materials such as, for example, ceramics, glass, fiber-resin components, etc. Other suitable materials include those used for manufacturing known pressure-burst rings or rupture disks. Once a suitable material is selected, the design thickness of the breakable panel can be adjusted based on the required out-of-tolerance force. For example, the thickness of the breakable panel can be increased to increase the force required to break the panel. The available thickness for a particular panel can be based on the material(s) selected for the panel (e.g., glass can be manufactured to a thickness of about 0.25 mm, fiber-resins can be manufactured to a thickness of about 0.1 mm). In certain embodiments of the present invention, the thickness of the breakable panel can be about 0.1 mm to 10 mm.

If a further adjustment to the fracture strength is needed, the breakable panel can be pre-weakened. For instance, in certain embodiments, defects can be distributed throughout the breakable panel to lower the break strength. These defects can include, for instance, scoring lines. The amount of scoring can be increased or decreased to modulate the break strength of the breakable panel. Control of the breakable panel material and thickness, and the ability to add additional defects to the panel surface, allow for a breakable panel to be designed having an arbitrary break strength. In some embodiments of the present invention, the breakable panel can be designed using Weibull distribution of break strength based on the needs of a given application, and in consideration of desired mechanical force tolerances.

In certain embodiments of the present invention, the breakable panel can be designed to fracture under a particular compressive force resulting from a screw torque applied to the component 110 or fastener 130. The conversion of screw torque into compressive force depends on a number of variables, including the materials of the fastener, substrate/socket material, presence of lubricant/adhesive agents, etc. Performance curves can be extracted for any given configuration of materials and circumstances to relate torque-to-compressive force using known techniques. In some embodiments of the present invention, these performance curves can be entered as a design consideration for the breakable panel.

Referring to FIG. 4B, in one or more embodiments, bottom panel 403 could be another breakable panel, such as another breakable disk, for instance, in the case where it is also desirable to detect defection of the mounted backplane or chassis. The sidewall 403 of light-blocking container 400 can also be a breakable panel, or alternatively, could be a light-blocking element or structure, such as a felt material or a nylon filament. In one or more embodiments, the light-blocking container can include a central opening 405 to accommodate a fastener 130 (or other set off) passing therethrough. For instance, the light-blocking container 400 could be, in one or more embodiments, a donut-shaped structure, such as depicted in the partially cut-away view of FIG. 4B.

In operation, for readout, light is sent by the controller through fiber optic line(s) to the dispersing lens(es) 304. If light is detected at the underside of the breakable panel 401 (i.e., within the light-blocking container 400), damage is assumed. In this variant, the lenses transfer force from component 110 or fastener 130 onto the top (breakable) panel 401. In one or more embodiments, the lens(es) 304 could be in direct contact with component 110, or spaced slightly from the component, to facilitate handling of the apparatus without breaking of the breakable panel. In another embodiment, a chassis-mounted light source could be provided, with the lens(es) 304 off to the side of mechanical integrity sensor 140.

Assuming that the breakable panel is fractured, light is collected by the light collector 410 within the light-blocking container when light illuminates the space between component 110 and chassis 120. The light collected by the light collector is indicative of occurrence of an out-of-tolerance force on the component. As described herein, the mechanical integrity sensor, and the apparatuses disclosed, serve as an encapsulated optical collector, not needing an electrical readout or electrical signal, or electrical power, at the time of occurrence of the out-of-tolerance force on the component. This allows usage of the mechanical integrity sensor in different environments, including within an MRI machine, or a high-radiation environment, as examples.

In one or more other embodiments, the mechanical integrity sensor could be configured to mount directly to the component, such as a circuit board, or to act as a collar on a card or cable connector, rather than to a standoff. For instance, the mechanical integrity sensor could be incorporated along the sidewalls of a cable connector socket of a computer, according to one or more embodiments of the present invention. The mechanical integrity sensor could be manufactured in a similar manner to the mechanical integrity sensors described above.

For instance, for use detecting out-of-tolerance forces or damage to cable or card connectors, an embodiment can be employed designed to take the shape of the perimeter of the sleeve or sleeves housing the pins. As with other embodiments described, the sensor would be a hollow light-blocking container or structure (with a breakable panel), with its surface sealed to make contact with both the cable and device being monitored when seated normally. The light collector(s) could be housed inside of the sensor with an array of light emitters arranged around a perimeter of the sensor. In such an embodiment, the out-of-tolerance force being monitored can correspond to a cable seating force or torque that is sufficient to damage connector pins within the cable connector socket. In this manner, a power interlock of the controller can prevent power to circuits having damaged connector pins, and further damage to electrically coupled circuits can be prevented.

Those skilled in the art will note from the above description that provided herein are mechanical integrity sensors, or opto-isolated mechanical integrity sensors, which feature hysteresis or fuse-like properties that can be used to detect potential damage to, for instance, mounting points, connectors, or excessive deflection resulting from subjecting a component to excessive force in an environment where power is not currently available. In one or more embodiments, an opto-isolated interlock can be provided to detect mechanical integrity, and non-obvious mechanical damage from a temporary deflection or deformation. The component, or the system containing the component, can be powered down to prevent damage or injury when excessive force is detected. Further, when powering on a component, an interlock mechanism can be provided to prevent damage or injury where the component has been subjected to an out-of-tolerance force. Where an out-of-tolerance force has occurred, the sensor is tripped, logging the event to aid in product evaluation and service.

Figure 5:
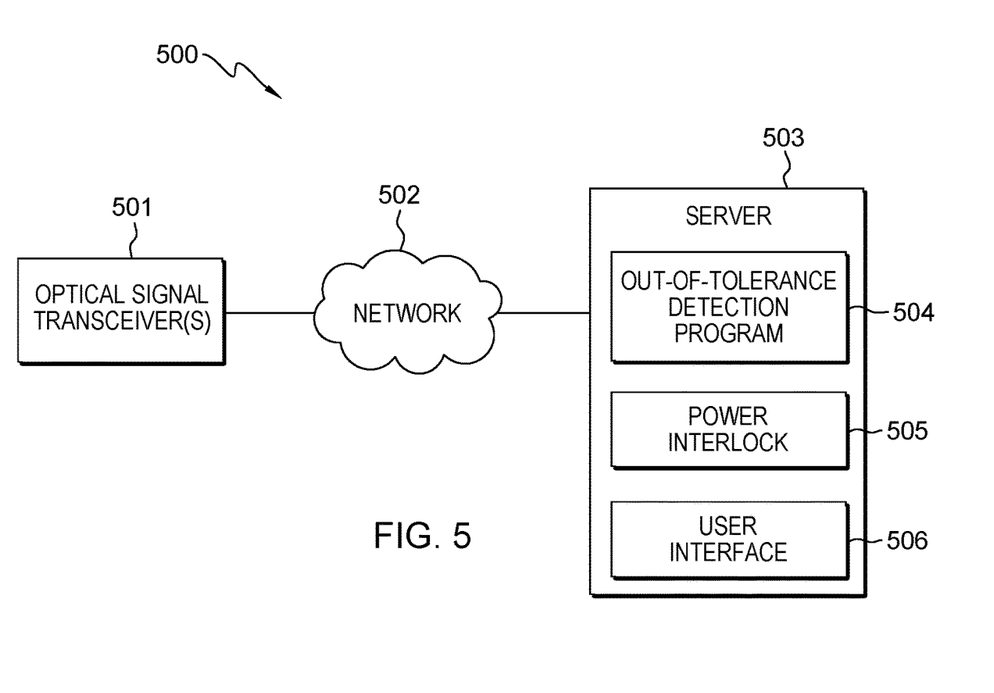
FIG. 5 depicts one embodiment of a controller to identify occurrence of an out-of-tolerance force on a component, and take an action based thereon, in accordance with one or more aspects of the present invention.

FIG. 5 depicts one embodiment of a controller 500 or out-of-tolerance force detection system 500, in accordance with one or more aspects of the present invention. In the embodiment depicted, controller 500 includes one or more optical signal transceivers 501 and a server 503, connected over a network 502.

In various embodiments, network 502 can be, for instance, wired, wireless, and/or fiber optic connections, an Intranet, a local area network (LAN), a wide area network (WAN), such the Internet. In general, network 502 can be any combination of connections and protocols that will support communication from optical signal transceiver(s) 501 to server 503.

Server 503 represents a computing platform that hosts, for instance, an out-of-tolerance detection program 504, a power interlock 505 and a user interface 506. Server 503 can include internal and external hardware components, such as depicted in FIG. 6, and described below.

The out-of-tolerance detection program 504, residing on server 503, can represent a computer program which receives and processes data generated by optical signal transceiver(s) 501, to detect occurrence of fracturing of the breakable panel of the light-blocking container indicative of the out-of-tolerance force on the component. In one or more embodiments, server 503 can monitor optical signals from a plurality of transceivers 501 that may be associated with the same component, or different components, within a system, or across multiple systems.

Power interlock 505 and user interface 506, in one or more embodiments of server 503, represent computer programs which provide power interlock to the component, such as described above, as well as receive and process data from out-of-tolerance detection program 504, in order to, for instance, display the received data, by way of a graphical user interface, augmented or virtual reality interface, or the like, if desired.

Figure 6:
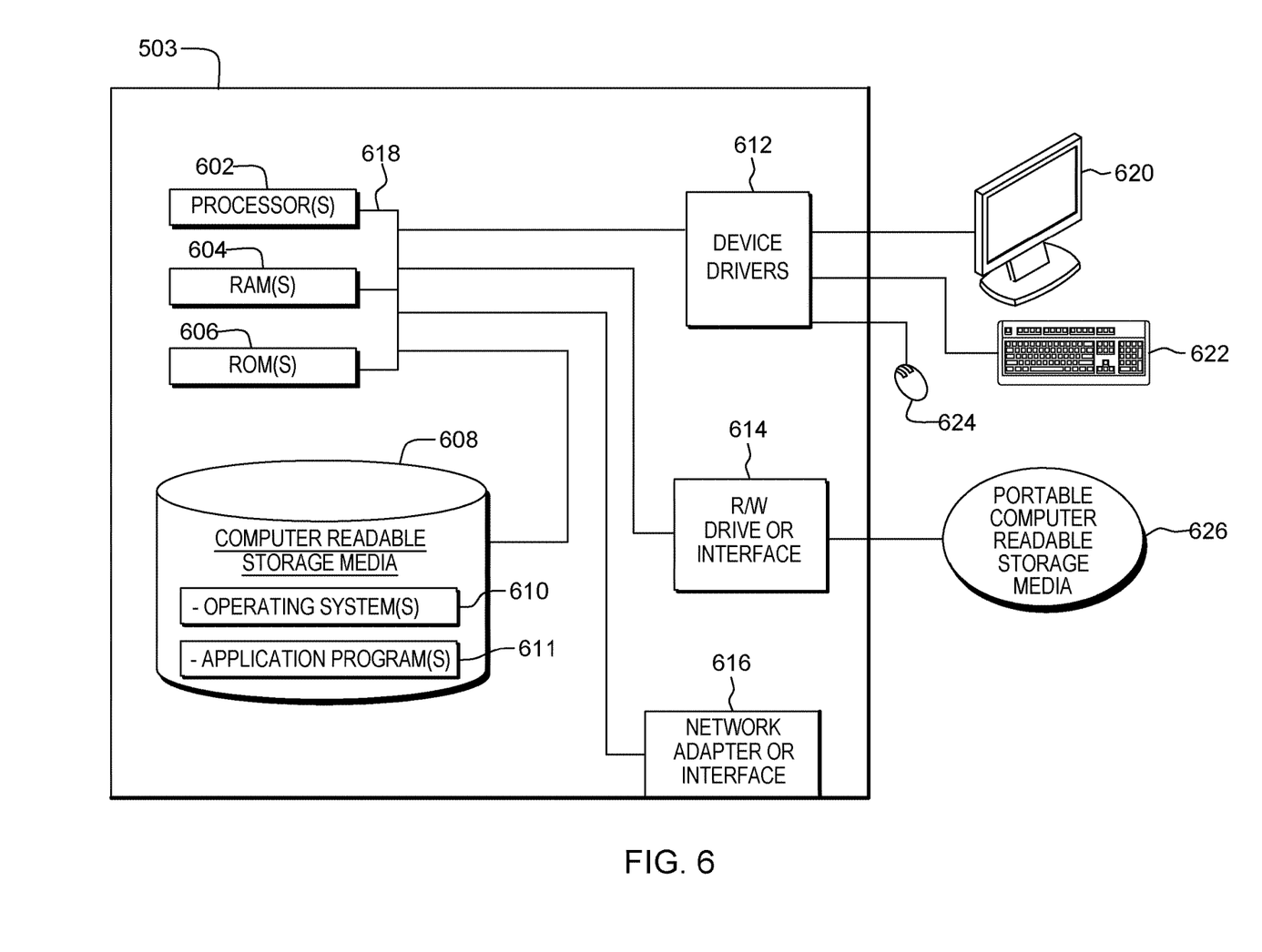
FIG. 6 depicts one embodiment of a computing environment to incorporate or facilitate implementing one or more control and/or monitor aspects of the present invention.

FIG. 6 depicts one embodiment of a computing environment which may implement one or more aspects of the above-discussed controller, or control processing, in accordance with one or more aspects of the present invention. As depicted in FIG. 6, the server 503 (or in one or more embodiments, the optical signal transceiver) can include one or more processors 602, one or more computer-readable RAMs 604, one or more computer-readable ROMs 606, one or more computer-readable storage media 608, device driver 612, read/write drive or interface 614, network adapter or interface 616, which may be interconnected over a communication fabric 618. Network adapter 616 communicates with a network 630. Communications fabric 618 can be implemented with any architectural design for passing data and/or control information between processors (such as microprocessors, communications and network processors, etc.), system memory, peripheral devices, as well as other hardware components within a system.

One or more operating systems 610, and one or more application programs 611, for instance, the out-of-tolerance detection program depicted in FIG. 5, are stored on or more of the computer-readable storage media 608 for execution by one or more of the processors 602 via one or more of the respective RAMs 604, which typically include cache memory. In the illustrated embodiment, each of the computer-readable storage media 608 can be a magnetic disk storage device of an internal hard drive, CD-ROM, DVD, memory stick, magnetic tape, magnetic disc, optical disc, a semiconductor storage device such as RAM, ROM, EPROM, flash memory, or other computer-readable tangible storage device that can store a computer program and digital information.

The optical signal transceiver or server can also include a read/write drive or interface 614 to read from and write to one or more portable computer-readable storage media 626. Application program 611 can be stored on one or more of the portable computer-readable storage media 626, read via the respective R/W drive or interface 614 and loaded into the respective computer-readable storage media 608. The computing environment can also include a network adapter or interface 616, such as a transmission control protocol (TCP)/Internet protocol (IP) adapter card or wireless communication adapter, such as a 4G wireless communication adapter using orthogonal frequency divisional multiple access (OFDMA) technology. Application program 611 can be downloaded to the computing environment from an external computer or external storage device via a network (for instance, the Internet, a local area network (LAN) or other wide area network (WAN) or wireless network) and network adapter or interface 616. From the network adapter or interface 616, the programs can be loaded onto computer-readable storage media 608. The network can include copper wires, optical fibers, wireless transmission, routers, firewalls, switches, gateway computers and/or edge servers. As shown, the computing environment can also include a display screen 620, a keyboard or keypad 622, a computer mouse or touch pad 624, and/or to display screen 620, for pressure sensing of alpha-numeric character entry and user selections. The device drivers 612, R/W drive or interface 614, and network adapter or interface 616 can include hardware and software (stored on computer-readable storage media 608 and/or ROM 606).

Computing environment 503 can be a stand-alone network server, or represent functionality integrated into one or more network systems. In general, the optical transceiver(s) and/or the server can be a laptop computer, desktop computer, specialized computer server, or any other appropriate system available in the art to implement the functionality described herein.

In certain embodiments, the optical signal transceiver and/or server represent computer systems utilizing clustered computers and components to act as a single pool of seamless resources when accessed through a network, such as a LAN, WAN, or a combination of the two. This implementation could be advantageous for a data center, or for cloud computing applications. In general, the optical signal transceiver(s) and/or the server can be any programmable electronic device, or any combination of such devices, capable of implementing the functions discussed herein.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

Certain control aspects of the present invention may be a system, a method, and/or a computer program product at any possible technical detail level of integration. The computer program product may include a computer readable storage medium (or media) having computer readable program instructions thereon for causing a processor to carry out control aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. An apparatus comprising:
   a mechanical integrity sensor to detect occurrence of an out-of-tolerance force on a component, the mechanical integrity sensor comprising:
   a light-blocking container with a breakable panel, the breakable panel fracturing with a force on the breakable panel indicative of the out-of-tolerance force on the component; and
   a light collector disposed within the light-blocking container, wherein fracturing of the breakable panel allows light into the light-blocking container, the light being collected by the light collector as indicative of occurrence of the out-of-tolerance force on the component.

2. The apparatus of claim 1, wherein the component is coupled to a chassis, and the mechanical integrity sensor is disposed between the component and the chassis.

3. The apparatus of claim 2, further comprising a light source to illuminate between the component and the chassis.

4. The apparatus of claim 3, wherein the light source comprises an optical fiber with a lens.

5. The apparatus of claim 4, wherein the lens is located between the component and the light-blocking container, and the force is transferred from the component across the lens to the breakable panel of the light-blocking container with occurrence of the out-of-tolerance force on the component.

6. The apparatus of claim 5, wherein the breakable panel is a top panel or a bottom panel of the light-blocking container, and the lens directly contacts the breakable panel with occurrence of the out-of-tolerance force on of the component.

7. The apparatus of claim 2, wherein the light-blocking container includes a central opening to accommodate a fastener passing therethrough, the fastener fastening the component to the chassis.

8. The apparatus of claim 7, wherein the light-blocking container is a donut-shaped structure, and the breakable panel is a top panel or a bottom panel of the light-blocking container, the breakable panel being closer to the component than to the chassis.

9. The apparatus of claim 2, further comprising a controller optically coupled to the light collector to identify when the light collector is collecting light within the light-blocking container, and based thereon, to perform an action due to occurrence of the out-of-tolerance force on the component.

10. The apparatus of claim 9, wherein the component comprises a circuit board, and the action performed by the controller comprises preventing powering up of the circuit board based on identifying occurrence of the out-of-tolerance force on the circuit board.

11. The apparatus of claim 1, wherein the out-of-tolerance force comprises a force selected from the group consisting of a deflection force, a torque force, an impact force and an insertion force applied to the component.

12. An apparatus comprising:
    a circuit board; and
    a mechanical integrity sensor associated with the circuit board to detect occurrence of an out-of-tolerance force on the circuit board, the mechanical integrity sensor comprising:
    a light-blocking container with a breakable panel, the breakable panel fracturing with a force on the breakable panel indicative of the out-of-tolerance force on the circuit board; and
    a light collector disposed within the light-blocking container, wherein fracturing of the breakable panel allows light into the light-blocking container, the light being collected by the light collector as indicative of the occurrence of the out-of-tolerance force on the circuit board.

13. The apparatus of claim 12, wherein the circuit board is coupled to a chassis, and the mechanical integrity sensor is disposed between the circuit board and the chassis, and wherein the apparatus further includes a light source to illuminate between the circuit board and the chassis.

14. The apparatus of claim 13, wherein the light source includes an optical fiber with a lens, the lens being located between the circuit board and the light-blocking container, and the force is transferred from the circuit board across the lens to the breakable panel of the light-blocking container with occurrence of the out-of-tolerance force on the circuit board.

15. The apparatus of claim 14, wherein the breakable panel is a top panel or a bottom panel of the light-blocking container, and the lens directly contacts the breakable panel with occurrence of the out-of-tolerance force on of the circuit board.

16. The apparatus of claim 12, further comprising a controller optically coupled to the light collector to identify when the light collector is collecting light within the light-blocking container, and based thereon, to perform an action due to occurrence of the out-of-tolerance force on the circuit board.

17. The apparatus of claim 16, wherein the action performed by the controller comprises preventing powering up, at least in part, of the circuit board based on identifying occurrence of the out-of-tolerance force on the circuit board.

18. A method of facilitating detecting an out-of-tolerance force on a component, the method comprising:

providing a mechanical integrity sensor to detect occurrence of the out-of-tolerance force on the component, the providing of the mechanical integrity sensor including:
   providing a light-blocking container with a breakable panel, the breakable panel fracturing with a force on the breakable panel indicative of the out-of-tolerance force on the component; and
   disposing a light collector within the light-blocking container, wherein fracturing of the breakable panel allows light into the light-blocking container, the light being collected by the light collector as indicative of occurrence of the out-of-tolerance force on the component.

19. The method of claim 18, wherein the component is coupled to a chassis, and providing the mechanical integrity sensor includes disposing the mechanical integrity sensor between the component and the chassis, and wherein the method further includes providing a light source to illuminate between the component and the chassis.

20. The method of claim 18, further including optically coupling the light collector to a controller to identify when the light collector is collecting light within the light-blocking container, and based thereon, to perform an action due to occurrence of the out-of-tolerance force on the component.

* * * * *